C. D. Moore,
Scroll Saw.
No. 101,300. Patented Mar. 29, 1870.

Witnesses
S. N. Piper
J. R. Snow

C. D. Moore
by his attorney
R. H. Eddy

United States Patent Office.

CHARLES D. MOORE, OF GILMANTON, NEW HAMPSHIRE.

Letters Patent No. 101,300, dated March 29, 1870.

IMPROVEMENT IN SAW-MILL.

The Schedule referred to in these Letters Patent and making part of the same

*To all persons to whom these presents may come:*

Be it known that I, CHARLES D. MOORE, of Gilmanton, of the county of Belknap and State of New Hampshire, have made a new and useful invention having reference to Jig-Saws; and I do hereby declare the same to be fully described in the following specification and represented in the accompanying drawings, of which—

Figure 1:
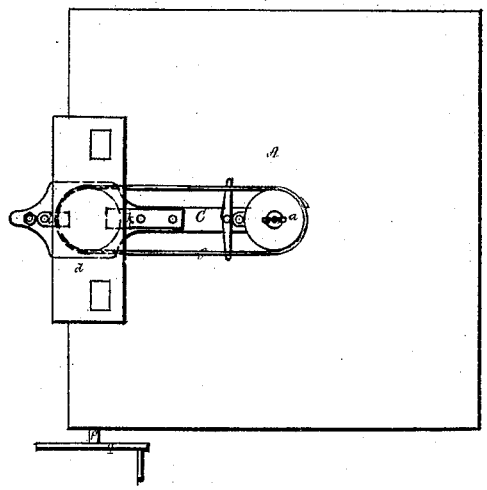
Figure 3:
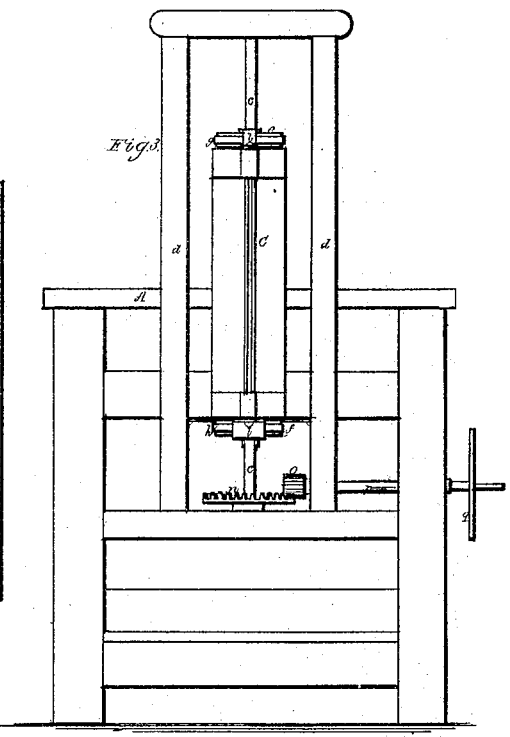
Figure 2:
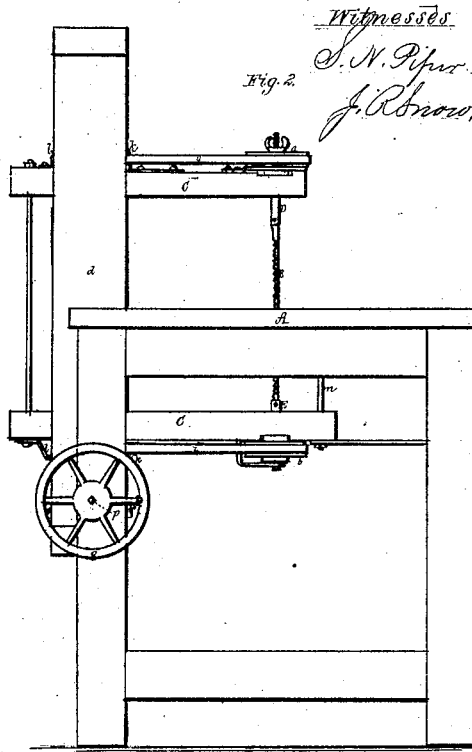

Figure 1 is a top view;
Figure 2 is a side elevation;
Figure 3, a rear elevation; and
Figure 4, a vertical and longitudinal section of a jig-saw and its frame as provided with my invention.

In the sawing-machine hereinafter described there is mechanism to enable the saw to be turned, as occasion may require, while the saw may be in operation, thus admitting of long boards being sawed by it to great advantage. Unless the saw is rendered capable of being turned more or less horizontally while it may be at work, an article, while being sawed by it, has generally to be turned more or less on the table, and, as a consequence, must have a somewhat limited length, but with the turning mechanism applied to the saw a board of any desirable length may be subjected to the action of the saw, and be sawed in any direction, either lengthwise or crosswise or obliquely of the board, as may be desirable.

In the drawings—

A denotes the frame or table for supporting the work or board while being sawed.

The saw B is supported within a separate frame or carrier, C, and by two spindles D E, which are disposed in a vertical line with the saw, and are applied to the carrier C, so as to be capable of being revolved therein.

Each of the said spindles carries one of two wheels or pulleys $a\ b$.

The saw-carrier C has a prismatic shaft, $c$, extending vertically through it, such shaft at top and bottom being pivoted to a frame, $d$, erected on and arranged with respect to the table, in manner as represented.

Furthermore, there are applied to the said prismatic shaft $c$ and to the saw-carrier C two wheels or pulleys $e\ f$, about which and the wheels $a\ b$ two endless chains or belts $g\ h$ work.

The wheels $e\ f$ slide freely up and down on the prismatic shaft, but are to be so applied to it in other respects as to be revolved by and with it whenever it may be put in revolution more or less.

Figure 4:
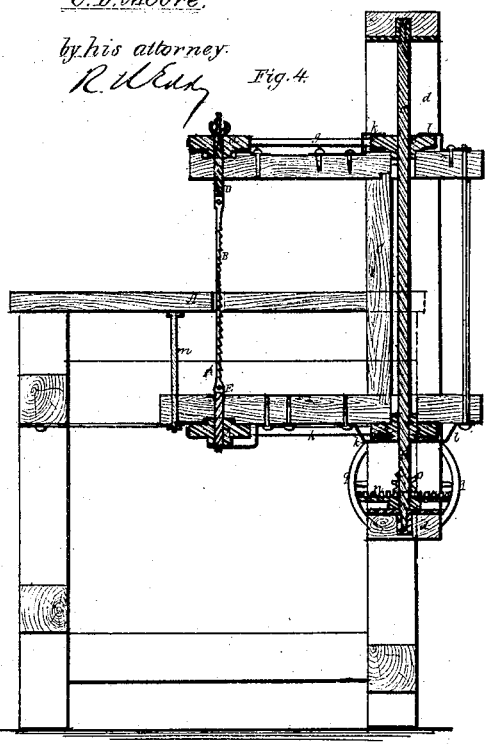

Each wheel, $e$ or $f$, is kept in place against the saw-carrier C by two clasps $k\ l$ fixed to the carrier and projecting upon the wheel, the same being as shown in fig. 4. The lower bar of the carrier C slides on a stationary guide-rod, $m$, applied to the table in manner as shown in fig. 4.

The power by which reciprocating, rectilinear, and vertical movements are to be imparted to the saw is to be applied to the carrier C, which, while in motion, will slide both on the prismatic shaft $c$ and on the guide-rod $m$.

A gear, $n$, fixed on the prismatic shaft near its lower end, engages with a pinion, $o$, fixed on a horizontal shaft, $p$, provided with a hand-wheel, $q$, the said shaft $p$ being duly supported within and by the table.

By laying hold of the hand-wheel and revolving it, rotary motion may be given to the prismatic shaft, whereby, by means of the endless belts and the pulleys thereof, the saw-spindles and the saw will be revolved.

Thus, it will be seen that, by means of appliances as set forth, the saw may be turned more or less while it may be in motion vertically.

I do not claim, in combination with the saw-carrier and the table, mechanism, substantially as described, or its equivalent, for effecting the turning of the saw while it may be in operation, or in the act of sawing an object supported on the table.

I claim the combination and arrangement of the saw-carrier guide $m$ with the table A, the saw-carrier C, the prismatic shaft $c$, and the pulleys, spindles, and endless belts applied to the carrier and the saw, as set forth.

CHAS. D. MOORE.

Witnesses:
R. H. EDDY,
S. N. PIPER.